United States Patent
Morimoto

(10) Patent No.: US 10,338,741 B2
(45) Date of Patent: Jul. 2, 2019

(54) FAILURE DETECTION DEVICE AND FAILURE DETECTION METHOD FOR INPUT INTERFACE DEVICE

(71) Applicant: Panasonic Intellectual Property Management Co., Ltd., Osaka (JP)

(72) Inventor: Hiroyuki Morimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 148 days.

(21) Appl. No.: 15/433,712

(22) Filed: Feb. 15, 2017

(65) Prior Publication Data

US 2017/0357372 A1  Dec. 14, 2017

(30) Foreign Application Priority Data

Jun. 10, 2016  (JP) ................. 2016-116445

(51) Int. Cl.
*G06F 3/041* (2006.01)
*G06F 3/14* (2006.01)
*G06F 3/044* (2006.01)

(52) U.S. Cl.
CPC ........... *G06F 3/0418* (2013.01); *G06F 3/044* (2013.01); *G06F 3/1423* (2013.01)

(58) Field of Classification Search
CPC ...... G06F 3/041; G06F 3/0412; G06F 3/0416; G06F 3/0418; G06F 3/044; G06F 3/048; G06F 3/0481; G06F 3/04817–04855
See application file for complete search history.

(56) References Cited

U.S. PATENT DOCUMENTS

| | | | |
|---|---|---|---|
| 2006/0227115 A1 | 10/2006 | Fry | |
| 2012/0172091 A1* | 7/2012 | Kurane | G06F 3/0488 345/173 |
| 2013/0207932 A1* | 8/2013 | Lee | G06F 3/0418 345/174 |
| 2014/0071077 A1* | 3/2014 | Kang | G06F 3/0488 345/173 |
| 2014/0098032 A1* | 4/2014 | Ng | G06F 3/0418 345/173 |
| 2014/0362046 A1 | 12/2014 | Yoshida | |

(Continued)

FOREIGN PATENT DOCUMENTS

| | | |
|---|---|---|
| JP | S61-237124 A | 10/1986 |
| JP | 2004-078606 A | 3/2004 |

(Continued)

*Primary Examiner* — Nathan Danielsen

(74) *Attorney, Agent, or Firm* — McDermott Will & Emery LLP

(57) ABSTRACT

A failure detection device according to the present disclosure is a failure detection device that detects a failure of an input interface device detecting a position on a screen, the position being selected by an input operation. The failure detection device includes a memory, and a controller connectable to the input interface device. The controller acquires position information of a predetermined selected region on a screen, calculates a counted number of determinations that the predetermined selected region is not present on a selected position on the screen, and determines that an input interface device is in an abnormal state in a case where the counted number satisfies a predetermined condition.

17 Claims, 13 Drawing Sheets

(56) References Cited

U.S. PATENT DOCUMENTS

| | | | |
|---|---|---|---|
| 2015/0135120 A1 | 5/2015 | Tanaka | |
| 2015/0370387 A1 | 12/2015 | Yamaguchi et al. | |
| 2016/0085361 A1* | 3/2016 | Jung | G06F 3/046 |
| | | | 345/173 |

FOREIGN PATENT DOCUMENTS

| | | |
|---|---|---|
| JP | 2008-535100 A | 8/2008 |
| JP | 2013-228972 A | 11/2013 |
| WO | 2006/105263 A2 | 10/2006 |

* cited by examiner

FAILURE DETECTION DEVICE AND FAILURE DETECTION METHOD FOR INPUT INTERFACE DEVICE

RELATED APPLICATIONS

This application claims the benefit of Japanese Application No. 2016-116445, filed on Jun. 10, 2016, the disclosure of which is incorporated by reference herein.

BACKGROUND

1. Technical Field

The present disclosure relates to a device and a method for detecting a failure in an input interface device such as a touch panel and a touch pad.

2. Description of the Related Art

Unexamined Japanese Patent Publication No. 2004-78606 discloses a method for detecting a malfunction in a resistance film contact-type touch panel. In such a detection method, a failure caused by a sudden contact defect in the touch panel and an otherwise case are isolated and detected.

SUMMARY

A failure detection device according to an aspect of the present disclosure is a failure detection device that detects a failure of an input interface device for detecting a position on a screen, the position being selected by an input operation. The failure detection device includes a memory, and a controller connectable to the input interface device. The controller acquires position information of a predetermined selected region on a screen, calculates a counted number of determinations that the predetermined selected region is not present on a detected position on the screen, and determines that an input interface device is in an abnormal state in a case where the counted number satisfies a predetermined condition.

A failure detection method according to another aspect of the present disclosure is a failure detection method for detecting failures of a plurality of input interface devices which detect and output input operations, the failure detection method comprising: from the plurality of input interface devices, (i) acquiring and accumulating pieces of position information which indicate positions on screens, the positions being selected in response to the input operations, or (ii) acquiring respective pieces of input information of the plurality of input interface devices and calculating acquisition frequencies of the acquired pieces of input information; and based on the accumulated pieces of position information or the calculated acquisition frequencies, determining whether or not the input interface device in the abnormal state is present among the plurality of input interface devices.

DETAILED DESCRIPTION

Hereinafter, exemplary embodiments will be described in detail with reference to the drawings. However, a description more in detail than necessary may be omitted. For example, a detailed description of well-known items and a duplicate description of substantially the same configurations may be omitted. The omission is made to avoid unnecessary redundancy of the following description and to facilitate the understanding of those skilled in the art.

Note that the inventors of the present disclosure provide the accompanying drawings and the following description in order to allow those skilled in the art to fully understand the present disclosure, and does not intend to limit the main subject, which is described in claims, by the accompanying drawings and description.

In the present disclosure, a description is given of a failure detection device and a failure detection method for determining abnormality of an input interface device based on touch information acquired from an input interface device such as a touch panel.

In the exemplary embodiments to be described below, input information (touch information) to the input interface device (for example, a touch panel) is accumulated, whereby it is determined whether or not the input interface device is abnormal, and a failure of the input interface device is detected. For example, it is conceivable that, since sensitivity of the touch panel is too high, a touch is erroneously detected though a user does not touch the touch panel. Alternatively, it is conceivable that, since the sensitivity of the touch panel is too low to enable sensing of a usual touch operation, the user repeats the touch operation many times, whereby a position different from an operation button is erroneously touched. In the present disclosure, the abnormality determination for the input interface device is made based on statistics of behaviors of the input interface device at such a time when the operation is input to the input interface device.

First Exemplary Embodiment 1-1. Configuration

A description is given of a failure detection device for an input interface device according to a first exemplary embodiment with reference to FIG. 1 to FIG. 5.

Figure 1:
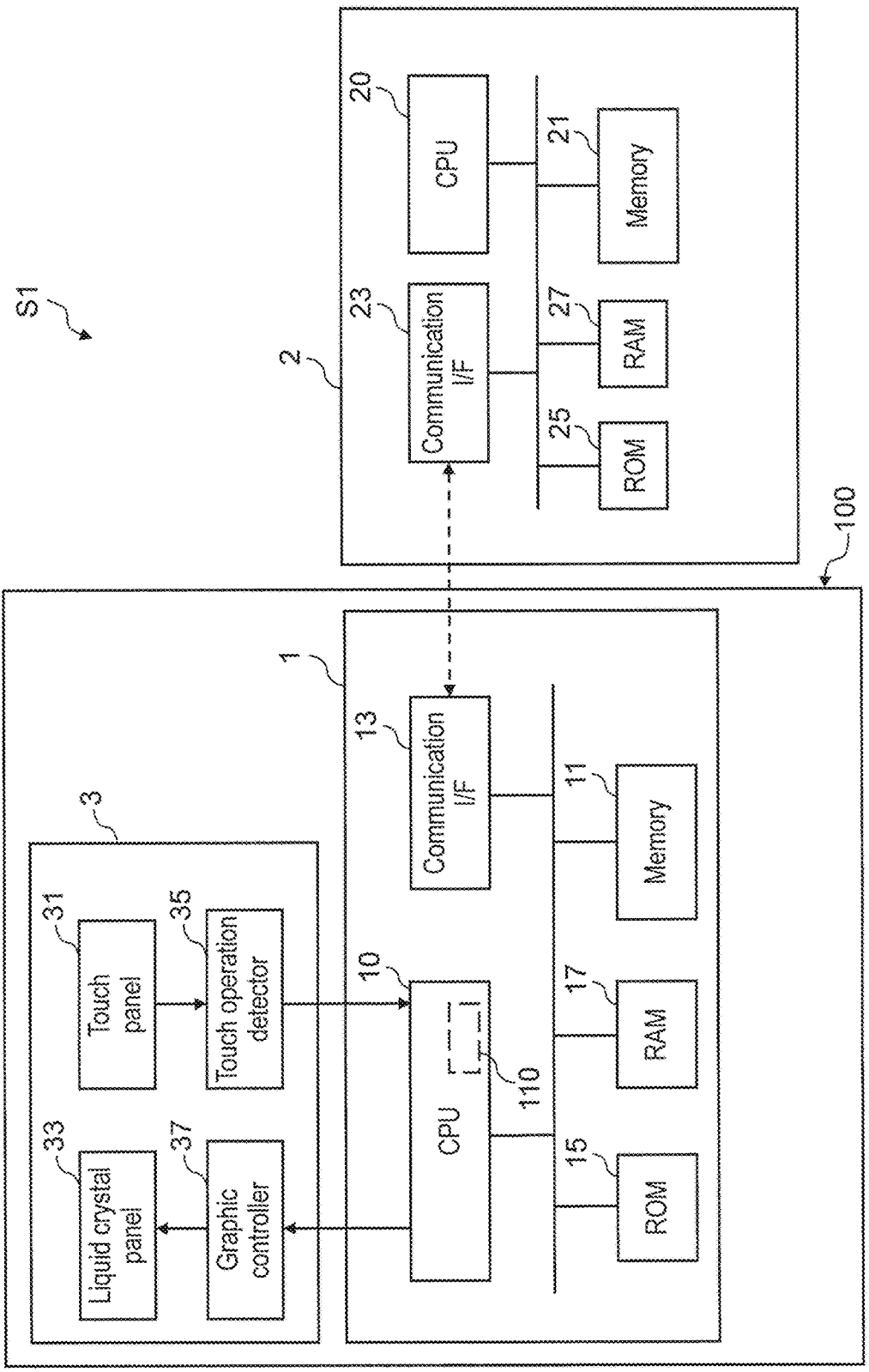
FIG. 1 is a diagram illustrating a configuration of a failure detection system for an input interface device according to a first exemplary embodiment.

FIG. 1 schematically shows a configuration of failure detection system S1 including: input/output terminal 100 which includes failure detection device 1 and input interface device 3; and server 2 communicable with input/output terminal 100.

For example, input/output terminal 100 is a computer terminal installed on each of a plurality of seats in aircrafts or other vehicles, facilities and the like. Input/output terminal 100 displays a predetermined screen in response to an input operation performed by a user through touch panel 31. Input/output terminal 100 also receives and displays a content, which includes a video and a sound, and which is distributed from server 2 installed in an inside of each vehicle such as an aircraft.

[1-1-1. Configuration of Failure Detection Device]

Failure detection device 1 is a computer device including central processing unit (CPU) 10, memory 11, communication I/F (interface) 13, read only memory (ROM) 15, and random access memory (RAM) 17, which are connected to one another by a bus.

CPU 10 (an example of the controller) executes a readout program, and thereby performs an arithmetic operation and control of data. In particular, CPU 10 executes a function of failure detector 110, which will be described later, based on touch information (input information) on touch panel 31.

Memory 11 is composed of a semiconductor memory or the like, and stores a program and data processed by CPU 10.

Communication I/F 13 is a circuit that enables a communication with 2.

ROM 15 stores a program executed by CPU 10, or fixed data as an arithmetic operation parameter. RAM 17 (an example of the memory) is used as a storage area and a work area for the program executed in processing of CPU 10 and the parameter appropriately changed in the processing of the program.

[1-1-2. Configuration of Input Interface Device]

Input interface device 3 includes touch panel 31, liquid crystal panel 33, touch operation detector 35, and graphic controller 37. Note that, in the illustrated example, graphic controller 37 is provided on the input interface device 3 side, but may be provided integrally with CPU 10.

Touch panel 31 is composed of a cover made of an insulator film such as glass and plastics, an electrode layer, and a substrate layer in this order from a side from which the user operates touch panel 31. In the electrode layer, transparent electrodes are arranged in a matrix in an X-axis (for example, an axis of abscissas) and a Y-axis (for example, an axis of ordinates). Note that, though touch panel 31 is illustrated with an example of an electrostatic capacitance-type touch panel in this exemplary embodiment, touch panel 31 may be another touch panel such as a touch panel of a resistance film type, an optical type, an ultrasonic wave type or an electromagnetic type.

Liquid crystal panel 33 displays screen data such as an image generated by graphic controller 37 to be described later. Liquid crystal panel 33 displays text data such as letters and numbers, a figure, a symbol, a static image, a moving picture, and the like.

Touch operation detector 35 sequentially scans the matrix of the X-axis and the Y-axis. Then, upon detecting a change of an electrostatic capacitance, touch operation detector 35 detects that a position concerned with the change is touched, then generates coordinate information of the touched position, and transmits the generated coordinate information as touch information to CPU 10.

Graphic controller 37 operates based on a control signal generated by CPU 10. Graphic controller 37 generates the screen data displayed on liquid crystal panel 33, and controls display operations of liquid crystal panel 33.

[1-1-3. Configuration of Server]

Server 2 is a computer device including CPU 20, memory 21, communication I/F (interface) 23, ROM 25 and RAM 27, which are connected to one another by a bus.

CPU 20 executes a readout program, and thereby performs an arithmetic operation and control of data. Memory 21 is a semiconductor memory, a magnetic disk or the like, and stores a program and data processed by CPU 20. Communication I/F 23 is a circuit that enables the communication with each input/output terminal 100. ROM 25 stores a program executed by CPU 20, or fixed data as an arithmetic operation parameter. RAM 27 is used as a storage area and a work area for the program executed in processing of CPU 20 and the parameter appropriately changed in the processing of the program.

[1-1-4. Configuration of Memory]

Figure 2:
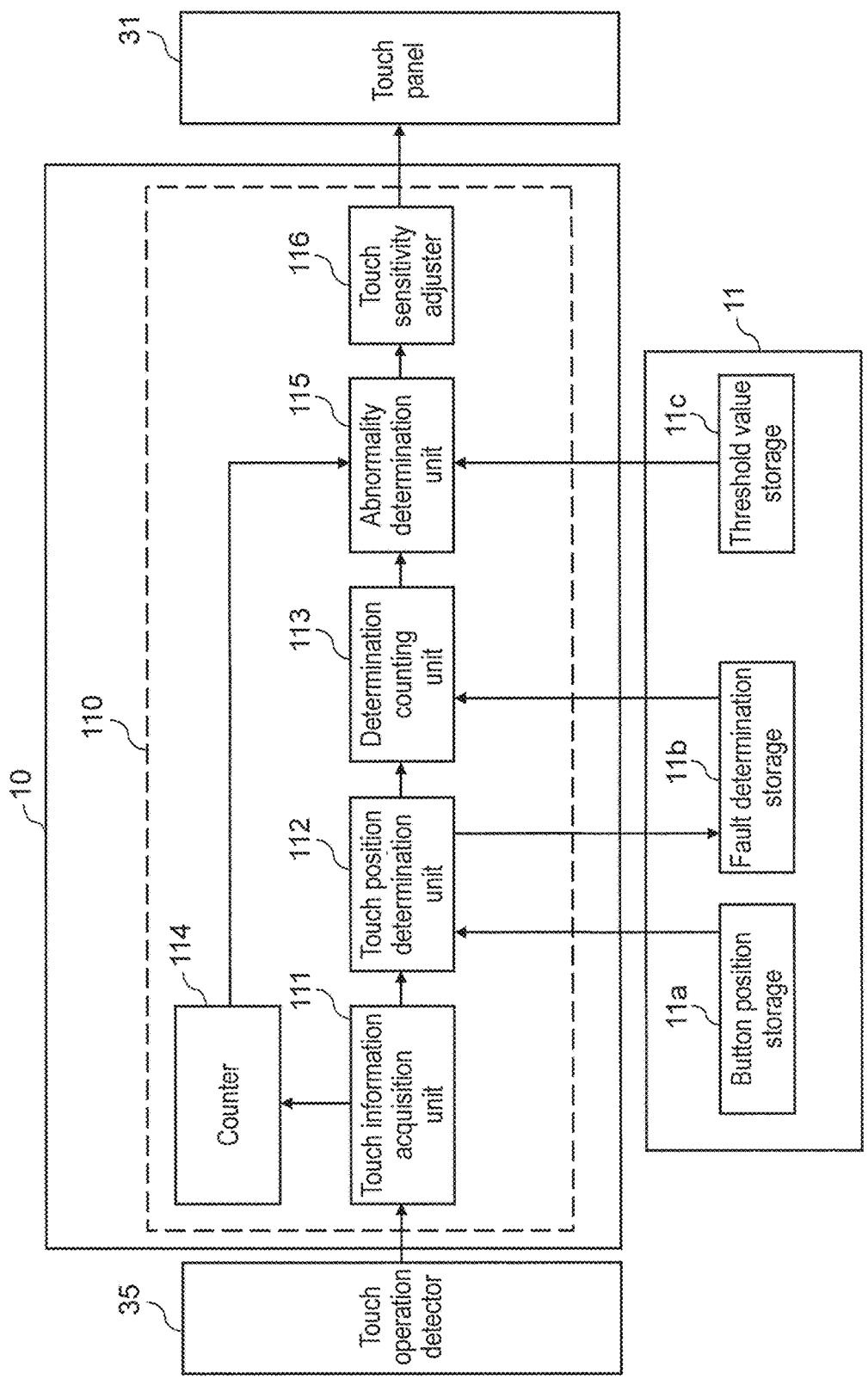
FIG. 2 is a functional block diagram of the failure detection device according to the first exemplary embodiment.

As shown in FIG. 2, memory 11 includes button position storage 11a, fault determination storage 11b, and threshold value storage 11c. Button position storage 11a stores a coordinate position of each of operation buttons (that is, an example of a predetermined selected region) on the predetermined screen. For example, as shown by reference symbol B in FIG. 4 and FIG. 5, the operation buttons are figures, letters, symbols and the like for receiving an input operation, which are displayed on screen 33a of liquid crystal panel 33. Fault determination storage 11b stores a result of a determination made by touch position determination unit 112 to be described later. Threshold value storage 11c stores a threshold value that serves as a reference of abnormality determination made by abnormality determination unit 115 to be described later.

[1-1-5. Functional Configuration of Failure Detection Device]

FIG. 2 is a control block diagram showing a functional configuration of failure detection device 1. Failure detection device 1 includes failure detector 110 in which CPU 10 mainly realizes respective functions by executing a predetermined program developed into a memory such as RAM 17. Failure detector 110 includes touch information acquisition unit 111, touch position determination unit 112, determination counting unit 113, counter 114, abnormality determination unit 115, and touch sensitivity adjuster 116.

Touch information acquisition unit 111 acquires the touch information from touch operation detector 35 that has detected the touch operation. The 5 touch information includes coordinate information indicating a touched position.

Touch position determination unit 112 compares the coordinate information acquired by touch information acquisition unit 111 and coordinate information of a button position in button position storage 11a with each other. In a case of having determined that both pieces of the coordinate information do not coincide with each other, that is, in a case of having determined that the operation button is not located on the detected touch position, touch position determination unit 112 stores a result of this determination (hereinafter, referred to as a fault determination) in fault determination storage 11b.

Figure 4:
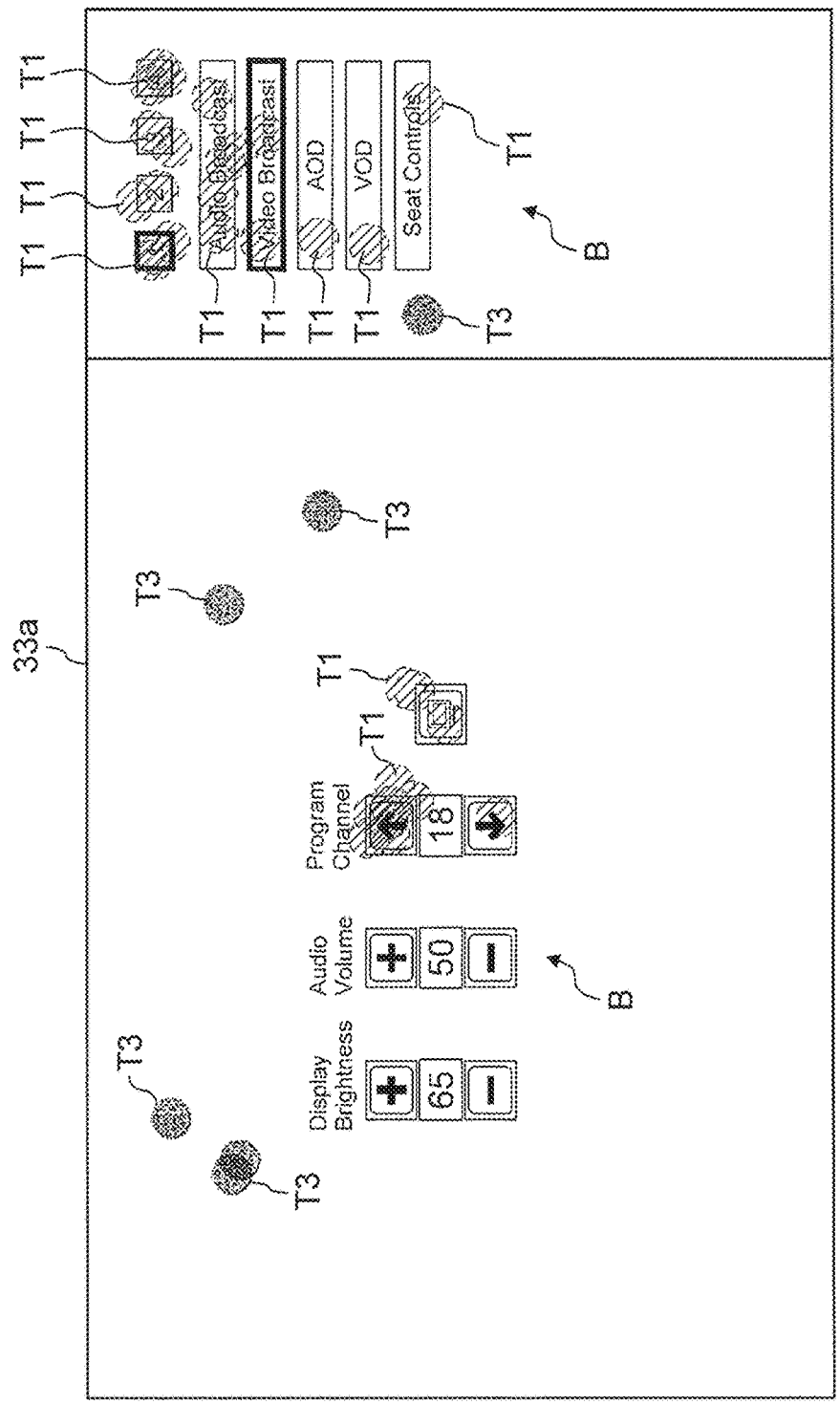
FIG. 4 is a view illustrating a relationship between operation button positions and touch positions on a screen of the input interface device.
Figure 5:
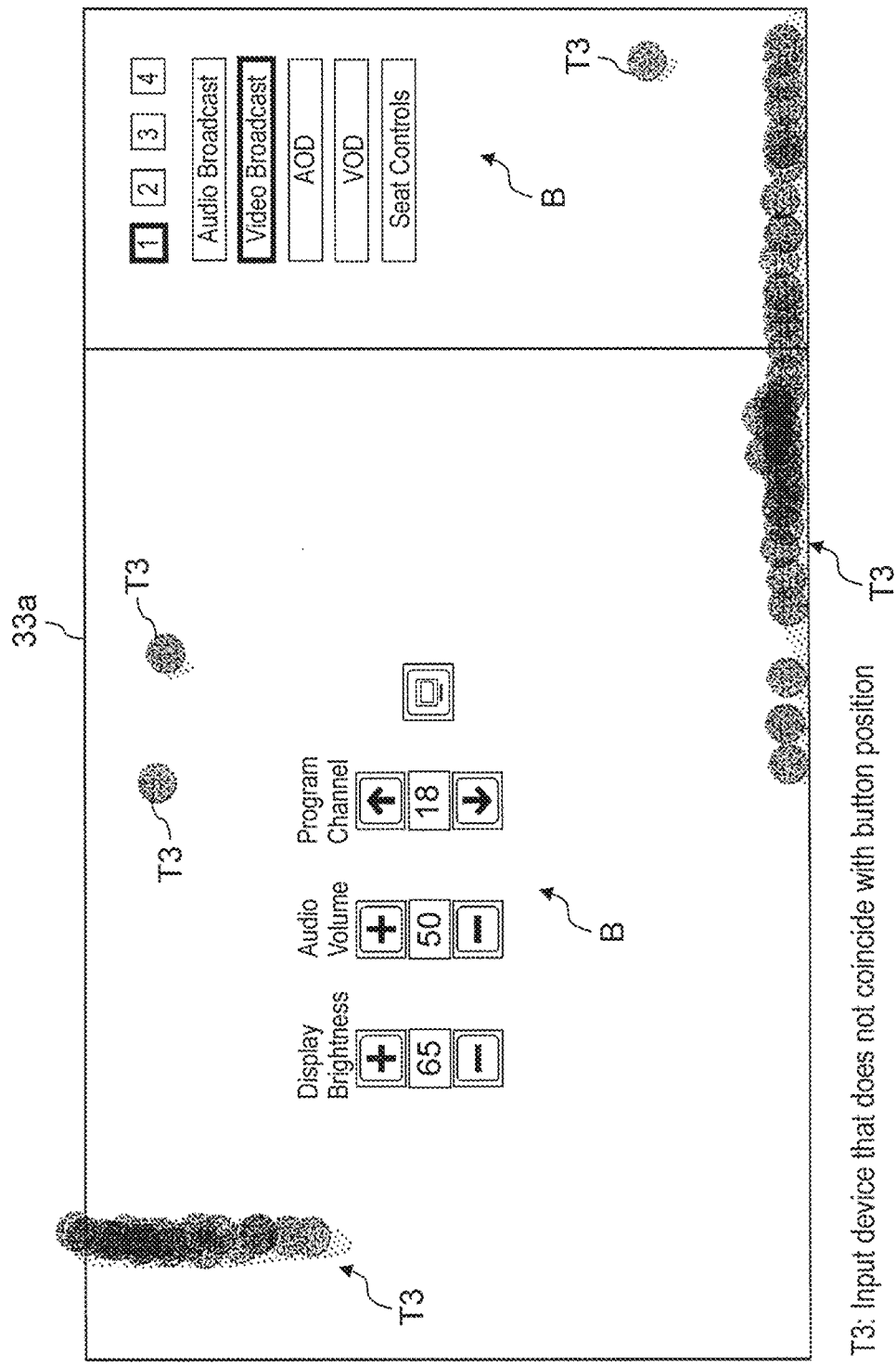
FIG. 5 is a view illustrating a relationship between the operation button positions and touch positions on the screen of the input interface device.

Note that, for example as shown by reference symbol T1 in FIG. 4, a state that the operation button is located on the detected touch position indicates a state where the coordinate information of the touched position and the coordinate information of the operation button coincide with each other. Meanwhile, as shown by reference symbol T3 in FIG. 4 and FIG. 5, a state that the operation button is not located on the detected touch position indicates a state where the coordinate information of the touched position and the coordinate information of the operation button do not coincide with each other.

Determination counting unit 113 counts the number of such fault determinations stored in fault determination storage 11b.

Abnormality determination unit 115 determines that input interface device 3 is abnormal in a case where a ratio of the number of the fault determinations by determination counting unit 113 to the number of acquisition times (total number of times of the touch detection) of the touch information, which is counted by counter 114, is a predetermined threshold value or more. Note that the predetermined threshold value is acquired from threshold value storage 11c.

In a case where input interface device 3 is determined to be abnormal by abnormality determination unit 115, touch sensitivity adjuster 116 adjusts touch input sensitivity of touch panel 31.

Here, with regard to such an adjustment of the sensitivity of the touch input, for example, in a case where the sensitivity of touch panel 31 is so high that a touch can be erroneously detected though the user does not touch panel 31, the sensitivity of touch panel 31 is adjusted so as to be decreased. Meanwhile, in a case where the sensitivity of touch panel 31 is so low that a usual touch cannot be detected, and the user erroneously touches a different position from the operation button by repeating the touch many times, then the sensitivity of touch panel 31 may be adjusted so as to be increased by touch sensitivity adjuster 116.

1-2. Operations

Figure 3:
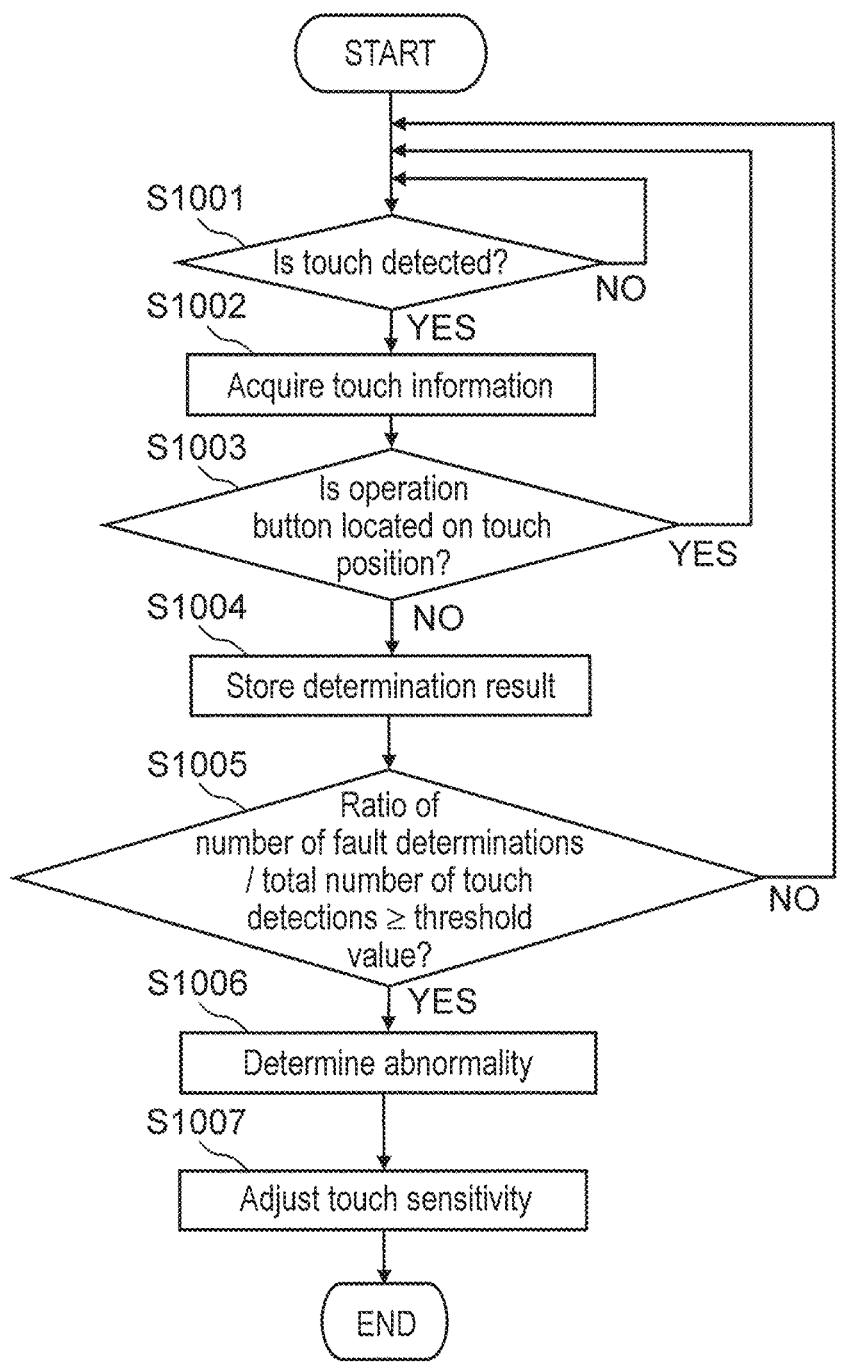
FIG. 3 is a flowchart illustrating operations of the failure detection device according to the first exemplary embodiment.

With reference to FIG. 3, a description is given of processing of failure detector 110 (FIG. 2), which is executed mainly by CPU 10 of failure detection device 1 according to this exemplary embodiment, that is, a failure detection method.

S1001: By touch information acquisition unit 111, it is determined whether or not the touch to touch panel 31 is detected by touch operation detector 35.

S1002: In a case where the touch is detected, the touch is acquired as the touch information. The number of acquisition times of the touch information is counted by counter 114.

S1003: By touch position determination unit 112, it is determined whether or not the coordinate information included in the touch information and the coordinate information of the operation button coincide with each other, that is, whether or not the operation button is located on the touched position. In a case where the operation button is not located on the touch position, the processing proceeds to Step S1004. Note that, in a case where the operation button is located on the touch position, input interface device 3 is instructed to display a screen corresponding to an operation concerned.

S1004: In a case where the operation button is not located on the touch position, a result of the determination is counted as a fault determination by determination counting unit 113.

S1005: By abnormality determination unit 115, it is determined whether or not the ratio of the counted number of fault determinations to the total number of touch detections counted by counter 114 has reached the threshold value or more.

S1006: In a case where the ratio of the number of fault determinations to the total number of touch detections has reached the threshold value or more, it is determined that touch panel 31 is abnormal by abnormality determination unit 115.

S1007: By touch sensitivity adjuster 116, the sensitivity of touch panel 31 is adjusted as mentioned above.

By the above-described functions brought by failure detector 110, such a malfunction that the touch operation for touch panel 31 is not normally performed can be easily detected and corrected.

1-3. Effects and the Like

Failure detection device 1 (an example of the failure detection device) according to this exemplary embodiment is a failure detection device that detects a failure of input interface device 3 (an example of the input interface device) that detects a position on screen 33a, which is selected by an input operation, the failure detection device including: RAM 17 (an example of the memory); and CPU 10 (an example of the controller) connectable to input interface device 3. CPU 10 acquires the position information of each of operation buttons B on screen 33a, calculates the counted number (number of times of fault determinations) of determinations that each operation button B is not located on the detected position on screen 33a, and determines that input interface device 3 is in an abnormal state in a case where the counter number satisfies a predetermined condition.

In failure detection device 1 according to this exemplary embodiment, input interface device 3 is determined to be in the abnormal state based on a counted number of such touch inputs to the region on screen 33a, which is different from the position of the operation button B. For example, the reason why the position of the operation button B and the touch position are different from each other is conceivable that, since the sensitivity of the touch panel is too high, the touch is erroneously detected though the user does not touch the touch panel. It is also conceivable that, since the sensitivity of the touch panel is too low to enable the sensing of the usual touch operation, the user repeats the touch operation many times, whereby the position different from the operation button is erroneously touched. As described above, failure detection device 1 according to this exemplary embodiment can easily detect the failure of input interface device 3 based on statistics of behaviors of input interface device 3 at the time of the input operation.

In failure detection device 1 according to this exemplary embodiment, CPU 10 adjusts the input sensitivity of input interface device 3 in a case of having determined that input interface device 3 is in the abnormal state. Therefore, the abnormal state of input interface device 3 can be solved quickly.

1-4. Modification Example

In addition to or in place of the adjustment of the touch sensitivity in the above-described exemplary embodiment, CPU 10 may display information, which reports the failure of input interface device 3, on liquid crystal panel 33 in the case where input interface device 3 is determined to be abnormal. In addition to or in place of this, CPU 10 may allow output of a sound or a voice, which reports a failure of touch panel 31, through a speaker provided separately in input/output terminal 100. Further in addition to or in place of these, CPU 10 may transmit a result of making such an abnormality determination through communication I/F 13 through server 2 together with identification information of input/output terminal 100. In this case, the abnormality determination acquired by and stored in server 2 may be stored in an external device or the like, and may be used as maintenance information. In this way, the abnormal state of input interface device 3 can be reported quickly and can be used as information for maintenance and the like.

In the above-described exemplary embodiment, abnormality determination unit 115 may determine the abnormality based on whether or not the ratio of the number of fault determinations to the total number of touch detections per unit time has reached a threshold value or more. Alternatively, abnormality determination unit 115 may determine the abnormality based on whether or not the total number of fault determinations has reached a threshold value, or whether or not the total number of fault determinations per unit time has reached the threshold value or more. In this case, failure detector 110 does not have to include counter 114 (FIG. 2).

Failure detection device 1 may be provided in CPU 20 of server 2. In this case, failure detection device 1 acquires the touch information from input interface devices 3 of a plurality of input/output terminals 200, and executes the failure detection for each of input interface devices 3.

Second Exemplary Embodiment

Hereinafter, a description is given of a failure detection device for an input interface device according to a second exemplary embodiment with reference to FIG. 6 to FIG. 8. In the second exemplary embodiment, server 2 includes failure detection device 201, acquires the touch information from a plurality of input/output terminals 200, and determines the abnormality of each of input/output terminals 200 based on the acquired touch information.

Note that, hereinafter, the same reference numerals will be assigned to the same constituents as those of the first exemplary embodiment, and a duplicate description will be omitted.

2-1. Configuration

Figure 6:
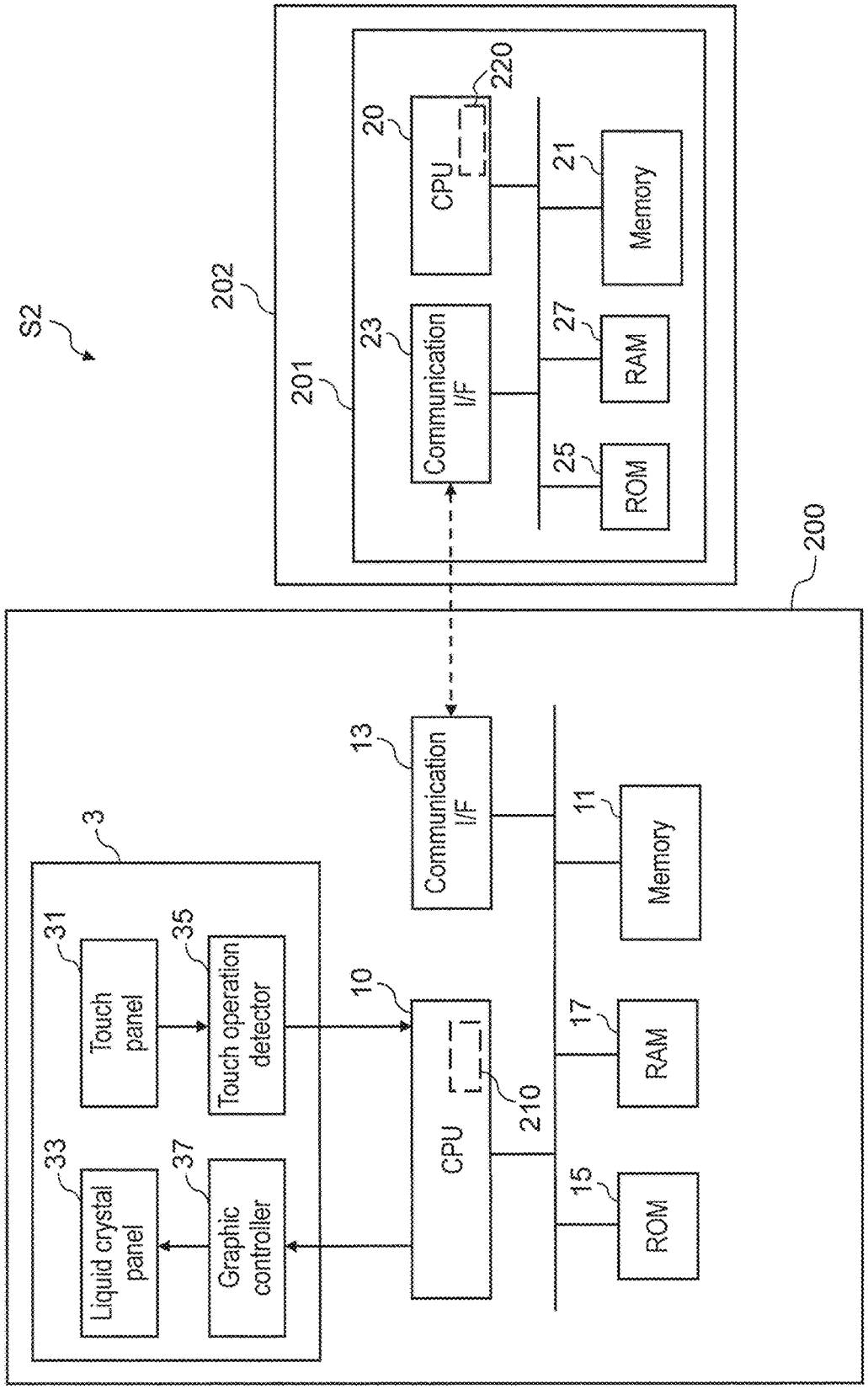
FIG. 6 is a diagram illustrating a configuration of a failure detection system for an input interface device according to a second exemplary embodiment.

FIG. 6 schematically shows a configuration of failure detection system S2 including: input/output terminal 200 which includes input interface device 3; and server 202 communicable with input/output terminal 200.

[2-1-1. Configuration of Input/Output Terminal]

Input/output terminal 200 is a computer device including CPU 10, memory 11, communication I/F (interface) 13, ROM 15 and RAM 17, which are connected to one another by a bus. Input/output terminal 200 further includes input interface device 3. Input/output terminal 200 is different from input/output terminal 100 in the first exemplary embodiment in a point of not directly executing the failure detection.

Similarly to the first exemplary embodiment, input interface device 3 includes touch panel 31, liquid crystal panel 33, touch operation detector 35, and graphic controller 37.

[2-1-2. Configuration of Server]

Similarly to the first exemplary embodiment, server 202 is a computer device including CPU 20, memory 21, communication I/F (interface) 23, ROM 25 and RAM 27, which are connected to one another by a bus. Server 202 is different from server 2 in the first exemplary embodiment in a point of including failure detector 220 realized by executing a predetermined program to be described later.

[2-1-3. Configuration of Memory]

Figure 7:
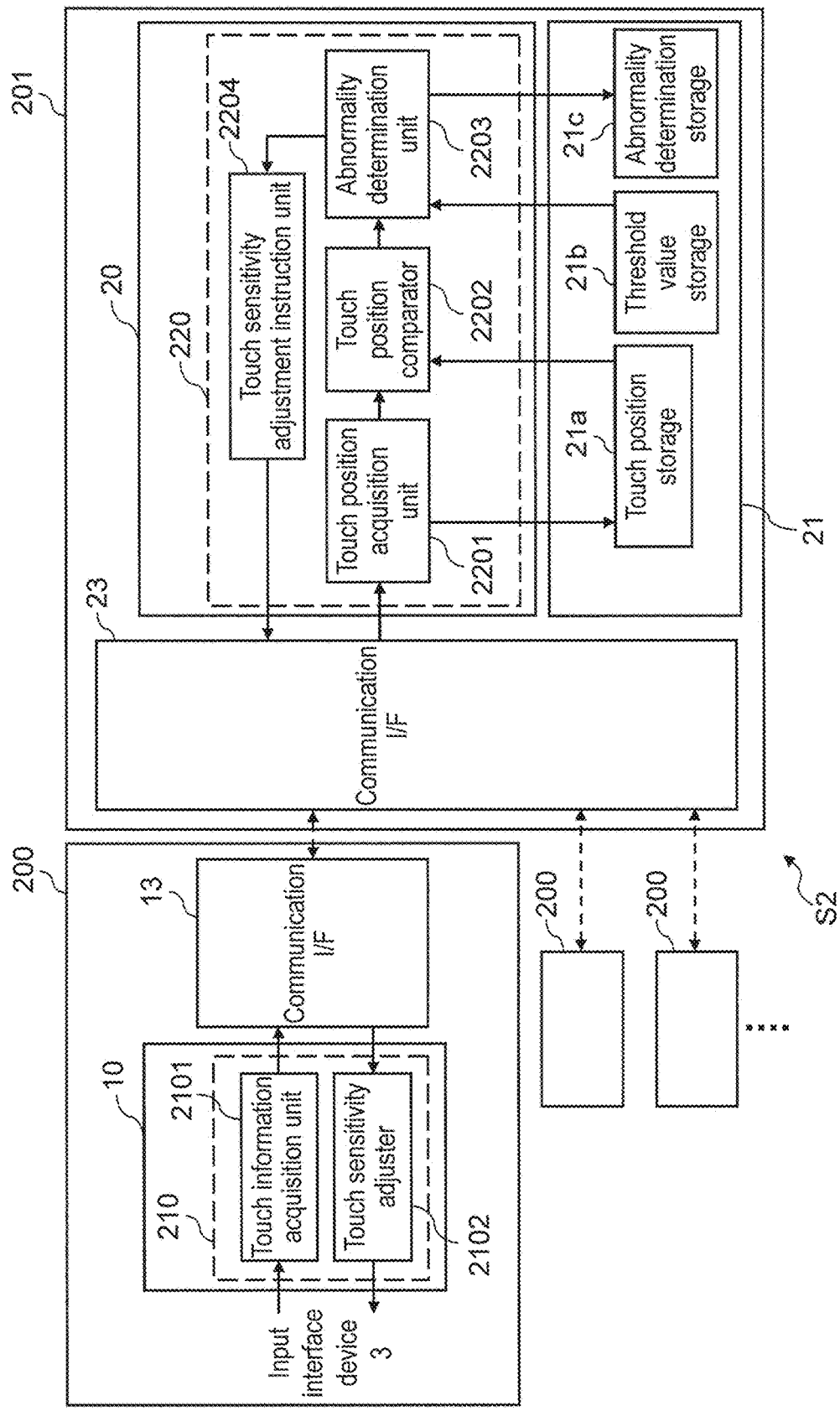
FIG. 7 is a functional block diagram of the failure detection device according to the second exemplary embodiment.

As shown in FIG. 7, memory 21 includes touch position storage 21a, threshold value storage 21b, and abnormality determination storage 21c. Touch position storage 21a stores the touch position (coordinate information) acquired from each of input/output terminals 200. Threshold value storage 21b stores a threshold value that serves as a reference of abnormality determination made by abnormality determination unit 2203 to be described later. Abnormality determination storage 21c stores identification information of input/output terminal 200 determined to be abnormal by abnormality determination unit 2203.

[2-1-4. Functional Configuration of Input/Output Terminal]

As shown in FIG. 7, input/output terminal 200 realizes touch information acquisition unit 2101 and touch sensitivity adjuster 2102 in such a manner that CPU 10 mainly executes a predetermined program developed into a memory such as RAM 17.

Touch information acquisition unit 2101 acquires the touch information from touch operation detector 35 that has detected the touch operation of the user for touch panel 31 (FIG. 6). The touch information includes coordinate information indicating a touched position. The acquired touch information is transmitted to server 202 through communication I/F 13.

Similarly to the first exemplary embodiment, touch sensitivity adjuster 2102 adjusts the touch sensitivity of touch panel 31 based on an instruction transmitted from server 202.

[2-1-5. Functional Configuration of Failure Detection Device]

FIG. 7 is a control block diagram showing a functional configuration of failure detection device 201 provided in server 202. Failure detection device 201 includes failure detector 220 in which CPU 20 mainly realizes respective functions by executing a predetermined program developed into a memory such as RAM 27. Failure detector 220 includes touch position acquisition unit 2201, touch position comparator 2202, abnormality determination unit 2203, and touch sensitivity adjustment instruction unit 2204.

Touch position acquisition unit 2201 acquires and counts touch position information, which is received from each of input/output terminals 200 through communication I/F 23, together with the identification information of input/output terminal 200, and stores the acquires and counted touch position information in touch position storage 21a.

Touch position comparator 2202 compares counted numbers of such touch positions, which are detected individually for a plurality of input/output terminals 200, with one another.

Abnormality determination unit 2203 determines whether or not there is an input/output terminal, in which the counted number of different touch positions is large, among the plurality of input/output terminals 200 in the comparison made by touch position comparator 2202. In a case where the counted number concerned is a threshold value or more, abnormality determination unit 2203 determines that this input/output terminal 200 is in an abnormal state, and stores a result of this determination in abnormality determination storage 21c. Note that the predetermined threshold value is acquired from threshold value storage 21b.

Touch sensitivity adjustment instruction unit 2204 transmits an instruction to adjust the touch sensitivity to input/output terminal 200 determined to be in an abnormal state by abnormality determination unit 2203.

2-2. Operations

Figure 8:
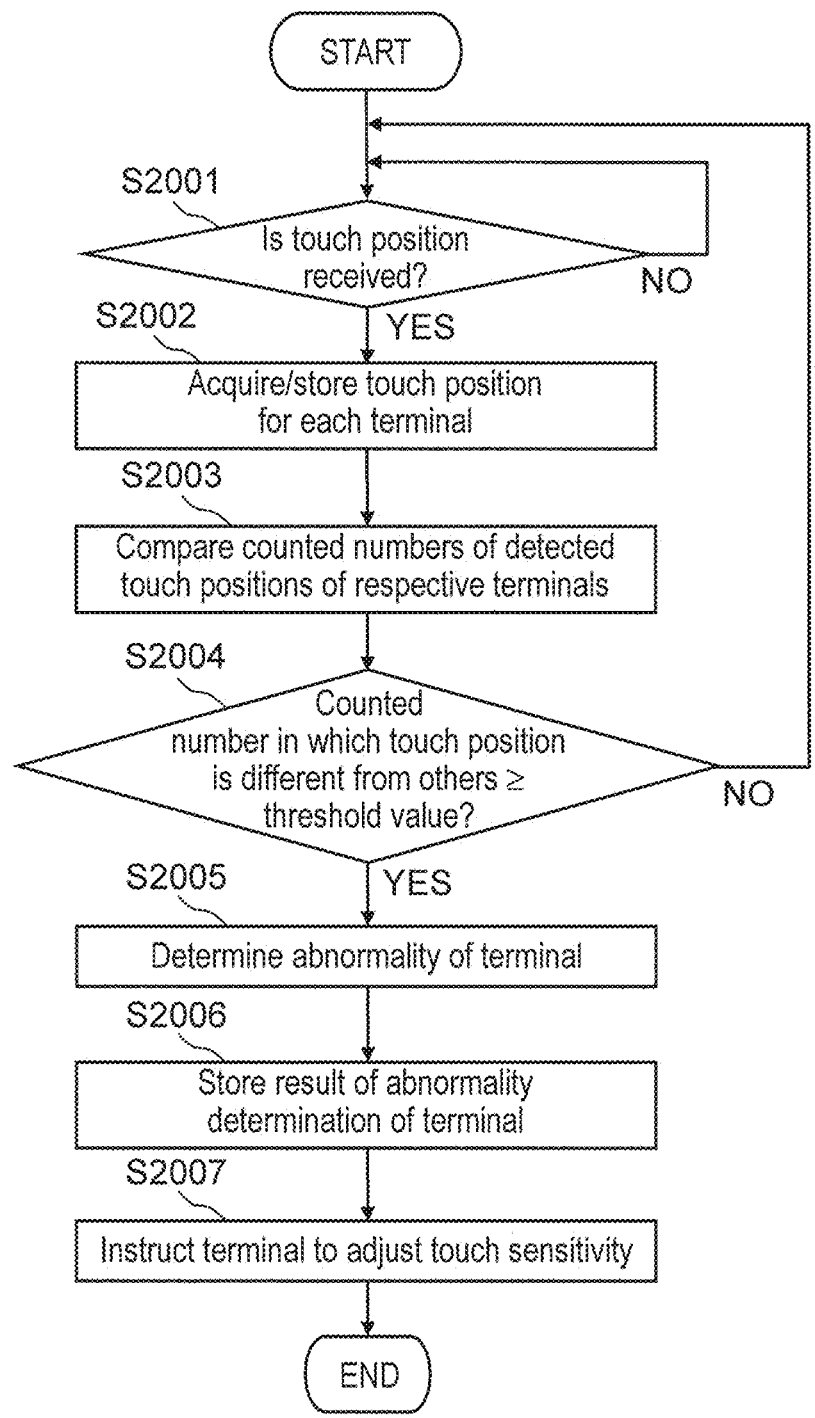
FIG. 8 is a flowchart illustrating operations of the failure detection device according to the second exemplary embodiment.

With reference to FIG. 8, a description is given of processing of failure detector 220 (FIG. 7), which is executed mainly by CPU 20 of failure detection device 201 according to this exemplary embodiment, that is, a failure detection method.

S2001: By touch position acquisition unit 2201, the touch positions are received from respective input/output terminals 200.

S2002: For respective input/output terminals 200, the touch positions (coordinate information) are acquired, and are stored in touch position storage 21a.

S2003: By touch position comparator 2202, the counted numbers of the touch positions, which are detected for respective input/output terminals 200, are compared with one another.

S2004: By abnormality determination unit 2203, it is determined whether or not there is an input/output terminal, in which the counted number of different touch positions is the threshold value or more, among the plurality of input/output terminals 200.

S2005: If it is determined that there is one among input/output terminals 200, in which the counted number is the threshold value or more, then by abnormality determination unit 2203, it is determined that input/output terminal 200 concerned is in an abnormal state.

S2006: A result of the abnormality determination for input/output terminal 200 concerned is stored in abnormality determination storage 21c.

S2007: By touch sensitivity adjustment instruction unit 2204, the instruction to adjust the touch sensitivity is transmitted to input/output terminal 200 concerned.

By the above-described functions brought by failure detector 220, such a malfunction that the touch operation for touch panel 31 is not normally performed can be easily detected and corrected for each of input/output terminals 200.

2-3. Effects and the Like

Failure detection device 201 (an example of the failure detection device) according to this exemplary embodiment is a failure detection device that detects the failures of the plurality of input interface devices 3 (examples of the input interface device) which detect and output the input operations. From the plurality of input interface devices 3, the failure detection device 201 acquires the position information indicating the positions on the screens, which are selected in response to the input operations, and counts pieces of the acquired position information. Then, based on the position information thus counted, the failure detection device 201 determines whether or not input interface device 3 in an abnormal state is present among the plurality of input interface devices 3.

In this exemplary embodiment, for example, there is assumed such a usage environment where the plurality of input/output terminals 200 are installed in an inside of a vehicle such as an aircraft, and the input/output terminals 200 output the same screen. In such a case, with regard to certain input/output terminal 200, in a case where a touch position different from touch positions of other input/output terminals 200 is detected, then it is highly probable that input interface device 3, that is, touch panel 31 of input/output terminal 200 concerned may be out of order. Hence, in the case where the touch position different from the touch positions detected in other input/output terminals 200 is detected, it is determined that input interface device 3 of input/output terminal 200 concerned is out of order.

Failure detection device 201 according to this exemplary embodiment determines the abnormal state based on accumulative and statistical data, and accordingly, can easily detect the failure of input interface device 3.

In failure detection device 201 according to this exemplary embodiment, CPU 20 adjusts the input sensitivity of input interface device 3 of input/output terminal 200 in the case where input interface device 3 is determined to be in the abnormal state. Therefore, the abnormal state of input interface device 3 of each of input/output terminals 200 can be solved quickly.

In failure detection device 201 according to this exemplary embodiment, in the case where the counted number of the determinations is the threshold value or more, the determinations being that the position indicated by the position information output from at least one input interface device 3 is different from the positions indicated by the position information output from the plurality of other input interface devices 3, then it is determined that at least one input interface device 3 concerned is in the abnormal state. Therefore, an influence given by an accidental touch is eliminated, and the abnormality determination is made based on a relative reference, and accordingly, accuracy of the abnormality determination can be enhanced.

2-4. Modification Example

In addition to or in place of the adjustment of the touch sensitivity in the above-described exemplary embodiment, CPU 20 may transmit an instruction to display failure report information on liquid crystal panel 33 to each of input/output terminals 200 in a case where touch panel 31 is determined to be abnormal. In addition to or in place of this, CPU 20 may transmit an instruction to output a sound or a voice, which reports the failure of touch panel 31, through a speaker provided separately in each of input/output terminals 200. Further in addition to or in place of these, CPU 20 may hold the abnormality determination acquired and stored for each of input/output terminals 200, or transmit the acquired and stored abnormality determination in an external device, and may use the abnormality determination as maintenance information.

In the above-described embodiment, failure detection device 201 may determine whether or not the plurality of input/output terminals 200 connected to failure detection device 201 display a predetermined screen, and may execute the abnormality determination based on a counted number of the touch positions, which is acquired in such a case where the predetermined screen is displayed. In this way, input/output terminal 200 different in behavior from other input/output terminals 200 can be extracted more accurately, and accordingly, the accuracy of the abnormality determination can be enhanced.

Third Exemplary Embodiment

Hereinafter, a description is given of a failure detection device for an input interface device according to a third exemplary embodiment with reference to FIG. 9 and FIG. 10. This exemplary embodiment is different from the first exemplary embodiment in that server 2 includes failure detection device 301, acquires the touch information from the plurality of input/output terminals 200, and determines the abnormality of each of input/output terminals 200 based on the acquired touch information. Moreover, failure detection device 301 according to this exemplary embodiment is different from failure detection device 201 according to the second exemplary embodiment in a point of making the abnormality determination of input/output terminal 200 based on an acquisition frequency of the touch information from each of input/output terminals 200.

Note that, hereinafter, the same reference numerals will be assigned to the same constituents as those of the first exemplary embodiment and the second exemplary embodiment, and a duplicate description will be omitted.

3-1. Configuration

Failure detection system S3 according to this exemplary embodiment has a similar configuration to the configuration of failure detection system S2 according to the second exemplary embodiment, which is shown in FIG. 6, and accordingly, a description of failure detection system S3 will be omitted.

Figure 9:
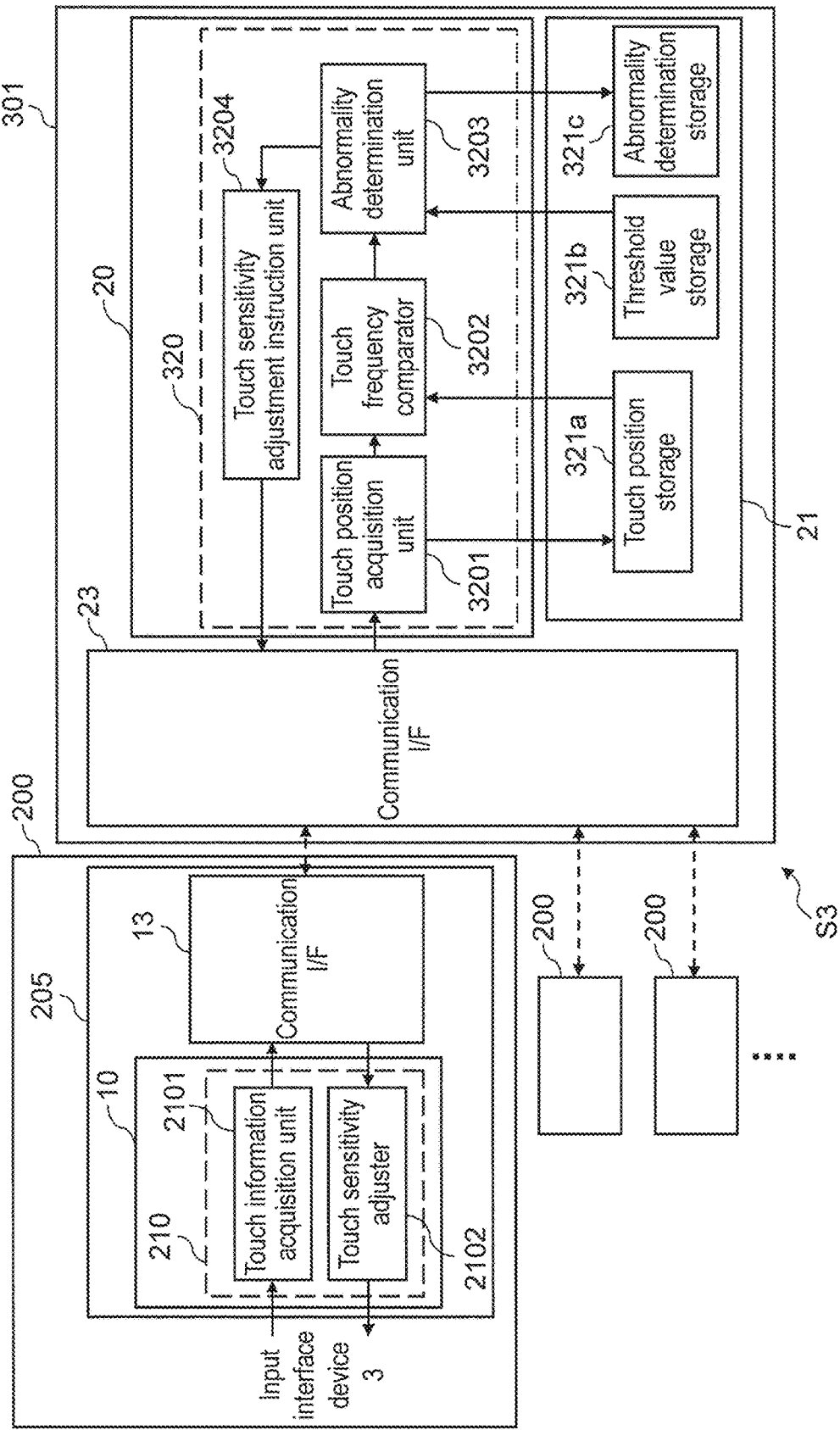
FIG. 9 is a functional block diagram of the failure detection device according to the third exemplary embodiment.

As shown in FIG. 9, memory 21 includes touch position storage 321a, threshold value storage 321b, and abnormality determination storage 321c. Touch position storage 321a stores the touch information acquired from each of input/output terminals 200. Threshold value storage 321b stores a threshold value that serves as a reference of an abnormality determination made by abnormality determination unit 3203 to be described later. Abnormality determination storage 321c stores identification information of input/output terminal 200 determined to be abnormal by abnormality determination unit 3203.

[3-1-1. Functional Configuration of Failure Detection Device]

FIG. 9 is a control block diagram showing a functional configuration of failure detection device 301 provided in server 202. Failure detection device 301 includes failure detector 320 in which CPU 20 (FIG. 6) mainly realizes respective functions by executing a predetermined program developed into a memory such as RAM 27 (FIG. 6). Failure detector 320 includes touch position acquisition unit 3201, touch frequency comparator 3202, abnormality determination unit 3203, and touch sensitivity adjustment instruction unit 3204.

Touch position acquisition unit 3201 acquires touch information, which is received from each of input/output terminals 200 through communication I/F 23, together with the identification information of input/output terminal 200. The touch information includes coordinate information indicating a touched position of touch panel 31.

Touch frequency comparator 3202 calculates acquisition frequencies of the touch information of respective input/output terminals 200, which is stored in touch position storage 321a, and compares the calculated acquisition frequencies with one another among input/output terminal 200.

Abnormality determination unit 3203 determines whether or not there is an input/output terminal, in which a touch frequency is high, among the plurality of input/output terminals 200 in the comparison made by touch frequency comparator 3202. In a case where such a difference in the touch frequency is a threshold value or more, abnormality determination unit 3203 determines that this input/output terminal 200 is in an abnormal state, and stores a result of this determination in abnormality determination storage 321c. Note that the predetermined threshold value is acquired from threshold value storage 321b.

Touch sensitivity adjustment instruction unit 3204 transmits an instruction to adjust the touch sensitivity to input/output terminal 200 determined to be in an abnormal state by abnormality determination unit 3203.

3-2. Operations

Figure 10:
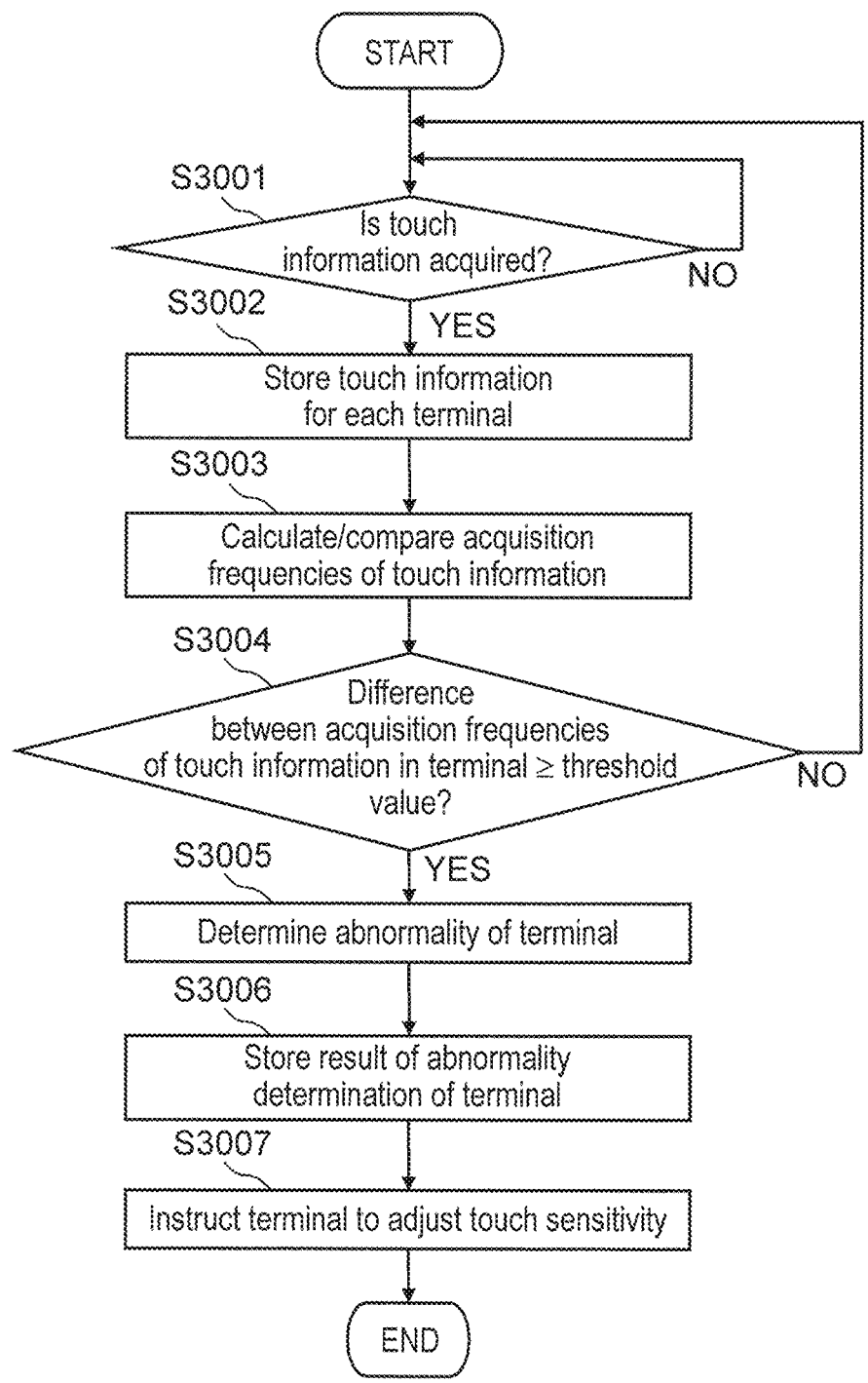
FIG. 10 is a flowchart illustrating operations of the failure detection device according to the third exemplary embodiment.

With reference to FIG. 10, a description is given of processing of failure detector 320 (FIG. 9), which is executed mainly by CPU 20 (FIG. 6) of failure detection device 301 according to this exemplary embodiment, that is, a failure detection method.

S3001: By touch position acquisition unit 3201, the touch information (coordinate information) is received from respective input/output terminals 200.

S3002: For respective input/output terminals 200, the touch information is stored in touch position storage 321a.

S3003: By touch frequency comparator 3202, the acquisition frequencies of the touch information are calculated for respective input/output terminals 200, and are compared among input/output terminals 200.

S3004: By abnormality determination unit 3203, it is determined whether or not there is an input/output terminal, in which a difference in the acquisition frequency of the touch information from other input/output terminals 200 is a threshold value or more.

S3005: By abnormality determination unit 3203, input/output terminal 200 concerned is determined to be in an abnormal state.

S3006: A result of the abnormality determination for input/output terminal 200 concerned is stored in abnormality determination storage 321c.

S3007: By touch sensitivity adjustment instruction unit 3204, an instruction to adjust the touch sensitivity is transmitted to input/output terminal 200 determined to be in an abnormal state.

By the above-described functions brought by failure detector 320, such a malfunction that the touch operation for touch panel 31 is not normally performed in each of input/output terminals 200 can be easily detected and corrected.

3-3. Effects and the Like

Failure detection device 301 (an example of the failure detection device) according to this exemplary embodiment is a failure detection device that detects the failures of the plurality of input interface devices 3 (examples of the input interface device) which detect and output the input operations. From the plurality of input interface devices 3, the failure detection device 301 acquires the respective touch positions (examples of the input information) of the plurality of input interface devices 3, calculates the acquisition frequencies of the touch positions. Then, based on the calculated acquisition frequencies, the failure detection device 301 determines whether or not input interface device 3 in an abnormal state is present among the plurality of input interface devices 3.

In this exemplary embodiment, for example, there is assumed such a usage environment where the plurality of input/output terminals 200 are installed in an inside of a vehicle such as an aircraft, and the input/output terminals 200 output the same screen. Note that, though it is not necessary that the plurality of input/output terminals 200 display the same screen simultaneously, the position to be touched by the user is determined for each screen since the same GUI (graphical user interface) is used as the usage environment. For example, the failure determination is made by using a phenomenon that the number of input times to the screen becomes extremely small after the user starts to watch a movie. In such a case as described above, it is probable that input interface device 3, that is, touch panel 31 of certain input/output terminal 200 may be out of order in a case where an acquisition frequency of the touch information in input/output terminal 200 concerned is higher than the acquisition frequencies of the touch information in other input/output terminals 200. Hence, in a case where the touch frequency in input/output terminal 200 concerned is higher than the touch frequencies of other input/output terminals 200, it is determined that input interface device 3 of input/output terminal 200 concerned is out of order.

Failure detection device 301 according to this exemplary embodiment determines the abnormal state based on accumulative and statistical data, and accordingly, can easily detect the failure of input interface device 3.

In failure detection device 301 according to this exemplary embodiment, CPU 20 adjusts the input sensitivity of input interface device 3 in the case where input interface device 3 of input/output terminal 200 is determined to be in the abnormal state. Therefore, the abnormal state of input interface device 3 of each of input/output terminals 200 can be solved quickly.

In failure detection device 301 according to this exemplary embodiment, in the case where a difference between the acquisition frequency of the input information output from at least one input interface device 3 and the acquisition frequencies of the input information output by other input interface devices 3 is the threshold value or more, abnormality determination unit 3203 determines that at least one input interface device 3 is in the abnormal state. Therefore, an influence given by an accidental touch is eliminated, and the abnormality determination is made based on a relative reference, and accordingly, the accuracy of the abnormality determination can be enhanced.

3-4. Modification Example

In addition to or in place of the adjustment of the touch sensitivity in the above-described exemplary embodiment, CPU 20 may transmit an instruction to display failure report information on liquid crystal panel 33 to each of input/output terminals 200 in a case where touch panel 31 is determined to be abnormal. In addition to or in place of this, CPU 20 may transmit an instruction to output a sound or a voice, which reports the failure of touch panel 31, through a speaker provided separately in each of input/output terminals 200. Further in addition to or in place of these, CPU 20 may hold the abnormality determination acquired and stored for each of input/output terminals 200, or transmit the acquired and stored abnormality determination in an external device, and may use the abnormality determination as maintenance information.

In the above-described exemplary embodiment, failure detection device 301 calculates the acquisition frequencies of the touch information of the plurality of input interface devices 3, and based on the acquisition frequencies thus calculated, determines whether or not input interface device 3 in an abnormal state is present among the plurality of input interface devices 3. In this case, the touch information does not necessarily include the position information on the screen, and may be only input information indicating that an input operation is received. Further in this case, the input information is not limited to such an input made through touch panel 31, and may be information input through other input interface device such as a touch pad, a mouse, and a pen-type input device.

In the above-described embodiment, failure detection device 301 may determine whether or not the plurality of input/output terminals 200 connected to failure detection device 301 display a predetermined screen, and may execute the abnormality determination based on the acquisition frequencies of the touch information, which are acquired in such a case where the predetermined screen is displayed. In this way, input/output terminal 200 different in behavior from other input/output terminals 200 can be extracted more accurately, and accordingly, the accuracy of the abnormality determination can be enhanced.

Fourth Exemplary Embodiment 4-1. Configuration

Figure 11:
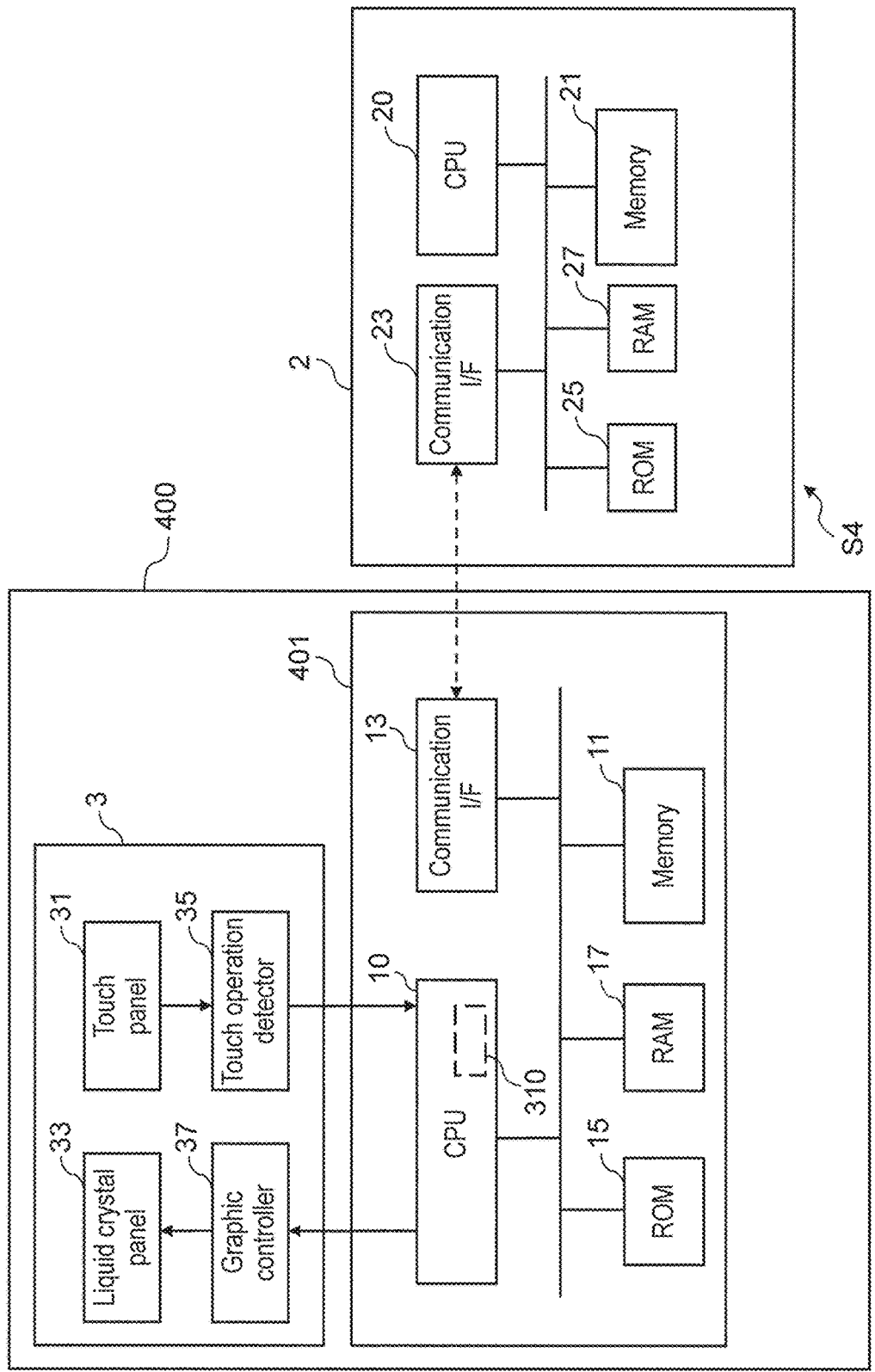
FIG. 11 is a diagram illustrating a configuration of a failure detection system for an input interface device according to a fourth exemplary embodiment.
Figure 12:
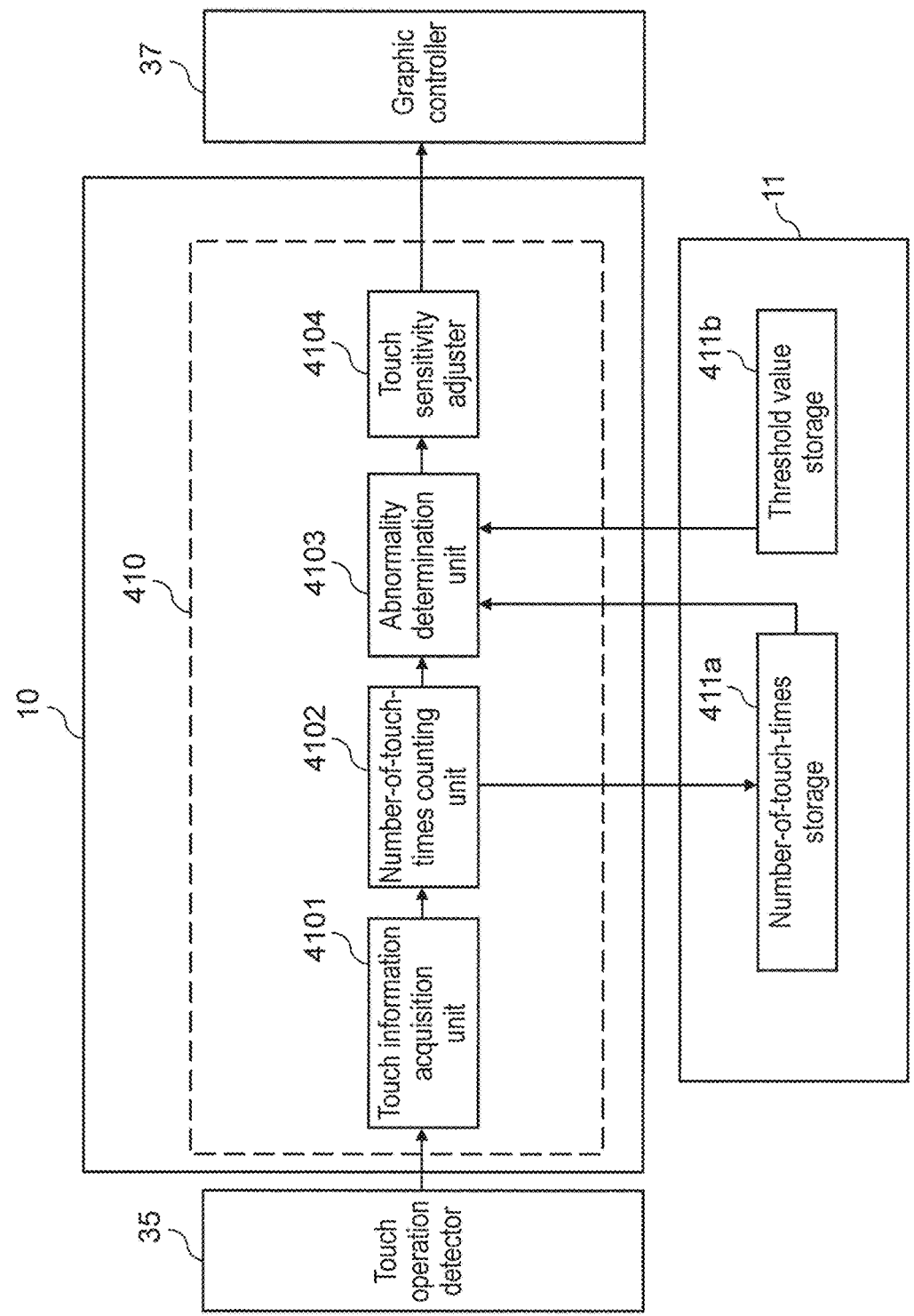
FIG. 12 is a functional block diagram of the failure detection device according to the fourth exemplary embodiment.
Figure 13:
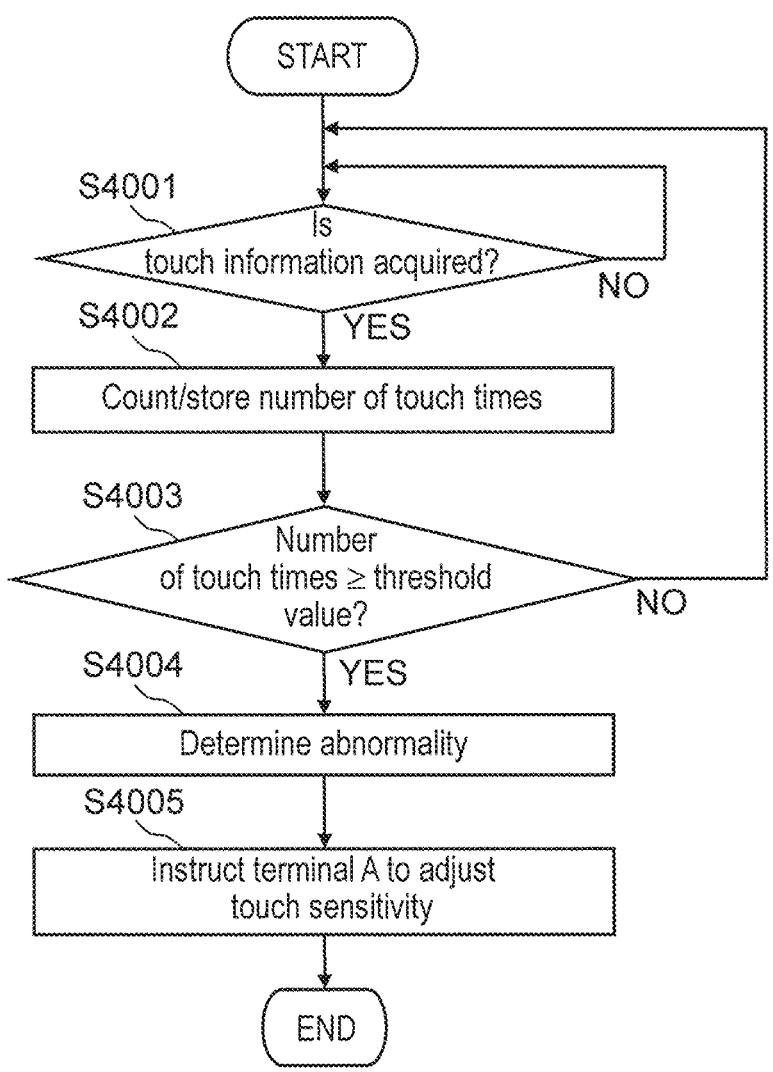
FIG. 13 is a flowchart illustrating operations of the failure detection device according to the fourth exemplary embodiment.

A description is given of a failure detection device for an input interface device according to a fourth exemplary embodiment with reference to FIG. 11 to FIG. 13.

This exemplary embodiment is different from the first exemplary embodiment in that failure detection device 401 according to this exemplary embodiment determines whether or not input/output terminal 400 is in an abnormal state based on only the number of touch times in input/output terminal 400.

Hereinafter, the same reference numerals will be assigned to the same constituents as those of the first exemplary embodiment, and a duplicate description will be omitted.

FIG. 11 schematically shows an overall configuration of failure detection system S4 according to this exemplary embodiment.

[4-1-1. Configuration of Failure Detection Device]

In a similar way to the first exemplary embodiment, failure detection device 401 is a computer device including CPU 10, memory 11, communication I/F (interface) 13, ROM 15 and RAM 17, which are connected to one another by a bus.

[4-1-2. Configuration of Input Interface Device]

Similarly to the first exemplary embodiment, input interface device 3 includes touch panel 31, liquid crystal panel 33, touch operation detector 35, and graphic controller 37. Note that, in the illustrated example, graphic controller 37 is provided separately on the input interface device 3 side, but may be provided integrally with CPU 10.

[4-1-3. Configuration of Server]

Similarly to the first exemplary embodiment, server 2 is a computer device including CPU 20, memory 21, communication I/F (interface) 23, ROM 25 and RAM 27, which are connected to one another by a bus.

[4-1-4. Configuration of Memory]

As shown in FIG. 12, memory 11 includes number-of-touch-times storage 411a and threshold value storage 411b. Number-of-touch-times storage 411a stores the number of times of the detected touches. Threshold value storage 411b stores a threshold value that serves as a reference of an abnormality determination made by abnormality determination unit 115 to be described later.

[4-1-5. Functional Configuration of Failure Detection Device]

FIG. 12 is a control block diagram showing a functional configuration of failure detection device 401. Failure detection device 401 includes failure detector 410 in which CPU 10 mainly realizes respective functions by executing a predetermined program developed into a memory such as RAM 17. Failure detector 410 includes touch information acquisition unit 4101, number-of-touch-times counting unit 4102, abnormality determination unit 4103, and touch sensitivity adjuster 4104.

Touch information acquisition unit 4101 acquires the touch information from touch operation detector 35 that has detected the touch operation. The touch information includes coordinate information indicating a touched position.

Number-of-touch-times counting unit 4102 counts or increases the number of touch times, which is acquired by touch information acquisition unit 4101, and stores the counted or increased number of touch times in number-of-touch-times storage 411a.

Abnormality determination unit 4103 determines whether or not the number of touch times, which is stored in number-of-touch-times storage 411a, is a threshold value, which is stored in threshold value storage 411b, or more, and determines that input interface device 3 is abnormal in a case of having determined that the number of touch times is the threshold value or more. Note that, in this case, the determined number of touch times may be a number of touch times per unit time.

In a case where input interface device 3 is determined to be abnormal by abnormality determination unit 115, touch sensitivity adjuster 4104 adjusts touch sensitivity of touch panel 31 in a similar way to the first exemplary embodiment.

4-2. Operations

With mainly reference to FIG. 13, a description is given of processing of failure detector 410 (FIG. 12), which is executed mainly by CPU 10 of failure detection device 401 according to this exemplary embodiment, that is, a failure detection method.

S4001: By touch information acquisition unit 4101, it is determined whether or not the touch to touch panel 31 is detected by touch operation detector 35.

S4002: In a case where the touch is detected, the number of touch times is counted or increased by number-of-touch-times counting unit 4102, and is stored in number-of-touch-times storage 411a.

S4003: By abnormality determination unit 4103, it is determined whether or not the number of touch times is the threshold value or more, and the processing proceeds to Step S4004 in a case where the number of touch times is the threshold value or more.

S4004: By abnormality determination unit 4103, it is determined that input interface device 3 of input/output terminal 400 concerned is abnormal.

S4005: By touch sensitivity adjuster 4104, the sensitivity of touch panel 31 in input interface device 3 is adjusted.

By the above-described functions brought by failure detector 410, such a malfunction that the touch operation for touch panel 31 is not normally performed can be easily detected and corrected.

4-3. Effects and the Like

Failure detection device 401 according to this exemplary embodiment is a failure detection device that detects a failure of input interface device 3, the failure detection device including: memory 11; and CPU 10 connectable to input interface device 3. In a case where the touch information as an example of the input information is acquired, the detected number of touch times is counted, and the counted number of touch times is the predetermined threshold value or more, then CPU 10 determines that input interface device 3 is in an abnormal state.

Therefore, failure detection device 1 according to this exemplary embodiment can determine the abnormality of input interface device 3 based on the detected touch information, and accordingly, can detect a failure of input interface device 3 by an easy method.

In failure detection device 1 according to this exemplary embodiment, CPU 10 adjusts the input sensitivity of input interface device 3 in the case of having determined that input interface device 3 is in the abnormal state. Therefore, the abnormal state of input interface device 3 can be corrected quickly.

4-4. Modification Example

In addition to or in place of the adjustment of the touch sensitivity in the above-described exemplary embodiment, CPU 10 may display information, which reports the failure of touch panel 31, on liquid crystal panel 33 in the case where touch panel 31 is determined to be abnormal. In addition to or in place of this, CPU 10 may allow output of a sound or a voice, which reports a failure of touch panel 31, through a speaker provided separately in input/output terminal 100. Further in addition to or in place of these, CPU 10 may transmit a result of making such an abnormality determination through communication I/F 13 through server 2 together with identification information of input/output terminal 100. In this case, the abnormality determination acquired by and stored in server 2 may be stored in an external device or the like, and may be used as maintenance information.

Failure detection device 401 may be provided in CPU 20 of server 2. In this case, failure detection device 401 acquires the touch information from input interface devices 3 of a plurality of input/output terminals 200, and executes the failure detection for each of input interface devices 3.

Other Exemplary Embodiments

As described above, the description is made of the first to fourth exemplary embodiments as illustration of the technology disclosed in the present application. However, the technology in the present disclosure is not limited to this, and is applicable also to exemplary embodiments, which are appropriately subjected to alteration, replacement, addition, omission, and the like. Moreover, it is also possible to form new exemplary embodiments by combining the respective constituents and functions, which are described in the foregoing first to fourth exemplary embodiments, with one another.

Accordingly, other exemplary embodiments are illustrated below.

[1] Failure detection device 201 according to the second exemplary embodiment performs the abnormality determination by comparing the acquired counted numbers of the touch positions among the plurality of input interface devices 3, and failure detection device 301 according to the third exemplary embodiment performs the abnormality determination by comparing the acquisition frequencies of the touch information among the plurality of input interface devices 3; however, the abnormality determination may be performed by combining these with each other. That is to say, only in a case where, with regard to certain input/output terminal 200 among the plurality of input/output terminals 200, (i) the counted number of the determinations that the touch positions are different is the threshold value or more, and (ii) the difference in the acquisition frequency of the touch information is the threshold value or more, then it may be determined that input/output terminal 200 concerned is in the abnormal state. Alternatively, it may be determined that input/output terminal 200 concerned is in the abnormal state if either one of such conditions (i) and (ii) is satisfied.

[2] In the first to fourth exemplary embodiments, the input operation performed by touch panel 31 serving as input interface device 3 is illustrated; however, the input operation of the present disclosure is not limited to this. For example, the input operation may be an input operation performed by an input interface device such as a touch pad, a mouse and a pen-type input device.

[3] Execution orders of the processing in the above-described first to fourth exemplary embodiments are not necessary restricted by the description of the foregoing embodiments, and the execution orders can be changed within the scope without departing from the spirit of the present disclosure. Moreover, it is also possible to omit a part of the processing.

[4] In each of the first to fourth exemplary embodiments, the failure detection device includes the memory, the ROM, the RAM and the communication I/F; however, the failure detection device according to the present disclosure is not limited to this. The failure detection device according to the present disclosure may have a configuration including only a CPU and a minimum memory required for processing by the CPU.

[5] The present disclosure includes a failure detection method executed by the failure detection device, a computer program executed by the failure detection device, and a computer-readable recording medium that records such a program. Here, as the computer-readable recording medium, for example, there can be mentioned a flexible disk, a hard disk, a CD-ROM, a Magneto-Optic: MO, a DVD, a DVD-ROM, a DVD-RAM, a BD (Blu-ray (registered trademark) Disc), and a semiconductor memory.

The above-described computer program is not limited to a computer program recorded in the above-described recording medium, and may be a computer program transferred via a telecommunication line, a wireless or wired communication line, a network including the Internet as a representative, and the like.

What is claimed is:

1. A failure detection method for detecting failures of a plurality of input interface devices each having a touch screen that detects and outputs input operations, the failure detection method comprising:
acquiring and accumulating pieces of position information from each of the plurality of input interface devices, which indicate positions on the touch screen at which touch operations are performed;
counting a number of determinations that a first position indicated by the pieces of position information for an image on the touch screen output from a first interface device among the plurality of input interface devices is different from a second position indicated by the pieces position information for the image on the touch screen output from remaining input interfaces devices among the plurality of other input interfaces devices; and
determining that the first input interface device is in the abnormal state, as a result of determining that the number is a threshold value or more.

2. The failure detection method according to claim 1, further comprising: adjusting input sensitivity of the first input interface device.

3. The failure detection method according to claim 1, wherein the number is a counted number per unit time.

4. The failure detection method according to claim 1, wherein:
it is determined whether or not the plurality of input interface devices display a predetermined screen, and
when the plurality of input interface devices display the predetermined screen, the position information is acquired.

5. A failure detection method for detecting failures of a plurality of input interface devices each having a touch screen that detects and outputs input operations, the failure detection method comprising:
acquiring respective pieces of input information from each of the plurality of input interface devices;
calculating acquisition frequencies of the pieces of input information for the plurality of input interface devices, respectively; and
determining that the first input interface device is in the abnormal state, as a result of determining that a difference between a first acquisition frequency as an acquisition frequency of the pieces of input information output from a first input interface device and a second acquisition frequency as an acquisition frequency of the pieces of input information which are output from remaining input interface devices among the plurality of other input interface devices is a threshold value or more.

6. The failure detection method according to claim 5, wherein:
the pieces of input information are position information indicating positions on the touch screen at which touch operations are performed.

7. The failure detection method according to claim 5, further comprising: adjusting input sensitivity of the first input interface device.

8. The failure detection method according to claim 5, wherein:
it is determined whether or not the plurality of input interface devices display a predetermined screen, and
when the plurality of input interface devices display the predetermined screen, the input information is acquired.

9. A failure detection device that detects failures of a plurality of input interface devices each having a touch screen that detects a position on the touch screen, the position being selected by an input operation, the failure detection device comprising:
a controller configured to acquire a position information which indicates the position from each of the plurality of input interface devices; and
a communication circuit configured to communicate with the plurality of input interface devices,
wherein the controller:
accumulates the position information of each of the plural input inter face devices;
counts a number of determinations that a first position indicated by pieces of position information for an image on the touch screen of a first interface device among the plurality of input interface devices is different from a second position indicated the pieces of position information for the image on the touch screen of remaining input interface devices among the plurality of input interface devices; and when the number is a threshold value or more, determines that the first input interface device is in an abnormal state.

10. The failure detection device according to claim 9, wherein the controller adjusts input sensitivity of the first input interface device in a case of having determined that the first input interface device is in the abnormal state.

11. The failure detection device according to claim 9, wherein the number is a counted number per unit time.

12. The failure detection device according to claim 9, wherein the controller executes at least one of operations, which are: (i) causing the first input interface device to display information indicating that the first input interface device is in the abnormal state; (ii) causing the first input interface device to output the information by a sound or a voice;

and (iii) transmitting the information to an external device.

13. A failure detection device that detects failures of a plurality of input interface devices each having a touch screen that detects a position on the touch screen, the position being selected by an input operation, the failure detection device comprising:
   a controller configured to acquire a position information which indicates the position from each of the plurality of input interface devices; and
   a communication circuit configured to communicate with the plurality of input interface devices,
   wherein the controller:
      acquires pieces of information; from each of the plurality of input interface devices;
      calculates acquisition frequencies of the pieces of input information for the plurality of input interface devices, respectively; and
      when a difference between a first acquisition frequency as an acquisition frequency of the pieces of input information output from a first input interface device and a second acquisition frequency as an acquisition frequency of the pieces of input information which are output from remaining input interface devices among the plurality of other input interface devices is a threshold value or more, determines that the first input interface device is in the abnormal state.

14. The failure detection device according to claim 13, wherein the pieces of input information are position information indicating positions on the touch screen at which touch operations are performed.

15. The failure detection device according to claim 13, wherein the controller adjusts input sensitivity of the first input interface device.

16. The failure detection device according to claim 13, wherein:
   the controller determines whether or not the plurality of input interface devices display a predetermined screen, and
   when the plurality of input interface devices display the predetermined screen, the input information is acquired.

17. A failure detection method for detecting failures of a plurality of input interface devices each having a touch screen, comprising:
   acquiring and storing pieces of position information from each of the plurality of input interface devices, which indicate positions on the touch screen at which touch operations are performed; and
   determining that the given input interface device is in an abnormal state, as a result of determining that, based on the pieces of position information, positions of touch operations on the touch screen of a given input interface device are different from positions of touch operations on the touch screen of at least one of remaining input interface devices other than the given input interface devices state.

* * * * *